(12) United States Patent
Fischer et al.

(10) Patent No.: US 8,074,533 B2
(45) Date of Patent: Dec. 13, 2011

(54) SERVO ASSISTANCE DEVICE FOR MOTOR VEHICLE VARIABLE-SPEED TRANSMISSION

(75) Inventors: Dieter Fischer, Nonnenhorn (DE); Klaus Spath, Berg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 416 days.

(21) Appl. No.: 12/444,286

(22) PCT Filed: Oct. 2, 2007

(86) PCT No.: PCT/EP2007/060447
§ 371 (c)(1),
(2), (4) Date: Apr. 3, 2009

(87) PCT Pub. No.: WO2008/043690
PCT Pub. Date: Apr. 17, 2008

(65) Prior Publication Data
US 2010/0016118 A1  Jan. 21, 2010

(30) Foreign Application Priority Data
Oct. 12, 2006  (DE) .................. 10 2006 048 254

(51) Int. Cl.
*B60K 17/10* (2006.01)
(52) U.S. Cl. .................................... 74/473.11
(58) Field of Classification Search .......... None
See application file for complete search history.

(56) References Cited

U.S. PATENT DOCUMENTS

| | | | | |
|---|---|---|---|---|
| 4,542,662 | A | | 9/1985 | Bieber |
| 5,850,760 | A | * | 12/1998 | Jin et al. .................. 74/473.11 |
| 2010/0175492 | A1 | * | 7/2010 | Spaeth et al. ............. 74/473.11 |
| 2010/0175493 | A1 | * | 7/2010 | Spaeth et al. ............. 74/473.11 |

FOREIGN PATENT DOCUMENTS

| | | |
|---|---|---|
| DE | 31 47 003 A1 | 10/1983 |
| DE | 195 39 472 A1 | 4/1997 |
| DE | 10 2004 042 609 A1 | 3/2006 |
| DE | 10 2006 006 651 A1 | 8/2007 |
| DE | 10 2006 006 652 A1 | 8/2007 |
| WO | 2005/119100 A1 | 12/2005 |
| WO | 2007/101754 A1 | 9/2007 |

OTHER PUBLICATIONS

Loomann, Toothed-Wheel Transmissions, 1988, p. 225; 2nd Edition, Springer Verlag.

* cited by examiner

*Primary Examiner* — Dirk Wright
(74) *Attorney, Agent, or Firm* — Davis & Bujold, P.L.L.C.

(57) ABSTRACT

A servo-assistance device (10) for a shift mechanism of a motor vehicle transmission, with which a characteristic curve can be produced which, as a function of a manual shifting force or a shift phase, has ranges of different gradients or proportionality to the manual shifting force. The servo-assistance device (10) includes an element (20) which is acted upon by the manual shifting force to be assisted. To produce the characteristic curve, the servo-assistance device (10) has components (42, 44, 50, 52) that are actuated by a servo-pressure (60) in such manner that the element (20) maintains its current position.

15 Claims, 5 Drawing Sheets

(PRIOR ART) Fig. 1

SERVO ASSISTANCE DEVICE FOR MOTOR VEHICLE VARIABLE-SPEED TRANSMISSION

This application is a National Stage completion of PCT/EP2007/060447 filed Oct. 2, 2007, which claims priority from German patent application serial no. 10 2006 048 254.9 filed Oct. 12, 2006.

FIELD OF THE INVENTION

The invention concerns a servo-assistance device for a shift mechanism of a motor vehicle transmission.

BACKGROUND OF THE INVENTION

Today's utility vehicles, such as buses and trucks, with their front control design, are characterized by spatial conditions for the accommodation of the transmission such that the transmission is necessarily a substantial distance away from the driver's seat. This distance is particularly large in the case of vehicles with under-floor or rear-mounted engines. Owing to the long and sometimes tight gearshift linkage used with mechanically shifted transmissions, exact gearshifts are often more difficult.

To allow the driver of a motor vehicle to devote his full attention to the traffic, he should so far as possible be relieved and assisted in all the activities needed for driving the motor vehicle.

Every driver knows how decisive the trouble-free operation of the gearshift system can be in difficult traffic situations. In this connection pneumatic shift-assisting devices for utility vehicles of any size can be helpful.

Servo-assistance devices known until now are partly fitted directly on the transmission itself and have a control rod and piston rod accessible from outside. The gearshift linkage is connected to the control rod. The assistance mechanism is activated by longitudinal movement of the control rod. This type of control is combined with two rod- or cable-pull shifts. A disadvantage in such cases is the sealing of the control and piston rod by bellows and the lack of lubrication. In trucks the location concerned is exposed to a lot of dirt. When the gearshift linkage ratio is changed, the beginning of the servo-assistance also changes or it has to be adapted by modifying the valve to suit the linkage ratio. The same applies to shifting aids that consist of a control valve and servo-cylinder separate from one another. The valve and cylinder are connected by spherical joints to the shift lever and a bracket, which is in turn fixed on the transmission. This arrangement has the additional disadvantage that at every shift the components move relative to the transmission and the chassis, so that the air lines connecting the valve and cylinder with one another can be perforated by chafing.

Such pneumatic shift aids with an open structure are known, consisting of a mechanical-pneumatic control element and a separate, pneumatic force element. A shift aid with an open structure is known from Loomann; Toothed-wheel transmissions; $2^{nd}$ edition; Springer Verlag; 1988; p. 225. The control element is a mechanically actuated control valve, which is actuated by a shift rod. In this case the transmission of the selection movement for gearshifts takes place mechanically, directly in the transmission. During transmission of the shift movement the control valve is actuated and at the same time the manual shifting force is transmitted mechanically to the transmission by a lever. During this, the manual shifting force is additionally assisted pneumatically by a compressed air cylinder. The compressed air cylinder, a two-position cylinder with integrated hydraulic damper, forms the pneumatic force element. In this case the manual shifting force is not imaged directly proportionally. The distances between the control and force elements are long, and the structure takes up a lot of space. Damage to the compressed air lines between the control and force portions can hardly be avoided.

DE 195 39 472 A1 discloses a shifting mechanism with a servo-assistance device for a motor vehicle transmission. A control rod of the servo-assistance device is arranged axially movably within a piston and co-operates, via a gearshift linkage, with a shift lever. On the piston rod is arranged a piston which can be acted upon on both sides by a pressure medium, and the piston co-operates with means for shifting the gear-type variable-speed transmission. Axial displacement of the control rod in the piston rod can actuate control valves by means of actuating pistons. The shifting force exerted upon the control rod via the shift lever and gearshift linkage is transferred proportionally by the piston rod to the means for shifting the gear-type variable-speed transmission. During this, the two sides of the shift mechanism produce shift forces of different size, so that various gears of the vehicle's transmission can be shifted with different shifting forces. The different shifting forces are produced by different valve characteristics, given by differently sized piston faces of the actuating pistons and/or by different geometrical dimensions of the two opposed surfaces of the piston.

In the unpublished applications by the present applicant with file numbers 10 2006 006 651.0 and 10 2006 006 652.9, a shift mechanism with servo-assistance for a vehicle transmission is disclosed, which comprises means for selecting and shifting a gear of the transmission and a control rod of the servo-assistance device, which is acted upon by the manual shifting force to be assisted. In the unpublished application with file number 10 2006 006 651.0 elastic elements are provided in the shift mechanism in order to change or limit the manual shifting force that acts upon the servo-assistance device before the force passes into the servo-assistance device. In the unpublished application with file number 10 2006 006 652.9, spring elements are provided in order to change the manual shifting force that acts on the servo-assistance device within the servo-assistance device before and/or during the production of the servo-assistance force, and thereby to influence the servo-assistance device in its action.

To produce different servo-assistance forces, it is necessary to have different elastic compliances or elasticities. Depending on the design, this can be difficult to achieve and may require structural space that is often not available.

DE 10 2004 042 609 A1 describes characteristics for a servo-assistance device for a shift mechanism of a motor vehicle transmission. As a function of a manual shifting force or a shift phase the characteristic curves have sections with different gradients or proportionality to the manual shifting force. It is not disclosed in DE 10 2004 042 609 A1 how the characteristics can be realized by design.

SUMMARY OF THE INVENTION

The purpose of the present invention is to indicate a servo-assistance device for a shift mechanism of a motor vehicle transmission, by means of which a characteristic curve that has sections with different gradients or proportionality to the manual shifting force as a function of the manual shifting force or a shift phase, can be produced in a path-independent manner.

The objective of the invention is achieved by a servo-assistance device of the type concerned.

A servo-assistance device for a shift mechanism of a motor vehicle transmission comprises a control rod acted upon by a manual shifting force that is to be assisted, a piston rod which co-operates with a means for shifting a gear-type variable-speed transmission, and a valve comprising a valve piston and a valve slide. According to the invention the servo-assistance device comprises means for producing a characteristic curve which, as a function of the manual shifting force or a shift phase, has sections with different gradient or proportionality to the manual shifting force in a path-independent manner, i.e. without a change in the current position of the control rod. The means consist of a trailing piston and a trailing piston spring. The trailing piston spring is arranged in the servo-assistance device in such manner that it is in contact on one side with an abutment on the piston rod and on the other side it pushes the trailing piston against another abutment of the piston rod. The trailing piston is arranged in the piston rod in such manner that it surrounds both the control rod and the valve piston, which is arranged fixed on the control rod. Above a certain manual shifting force a regulated servo-pressure become large enough to push the trailing piston, in opposition to the force of the trailing piston spring, against the valve piston. Thus the manual shifting force or control rod force is opposed both by the pressure force acting directly on the valve piston and by the pressure force transferred, via the trailing piston, to the valve piston. Accordingly, beyond a certain set position the pressure force that opposes the manual shifting force or control rod force is correspondingly increased. This produces an inflection point in the characteristic curve, beyond which its gradient is smaller so that its course is less steep.

BRIEF DESCRIPTION OF THE DRAWINGS

Below, the basic principle of the invention, which can be embodied in several ways, is explained in more detail considering an example, with reference to a drawing which shows.

DETAILED DESCRIPTION OF THE PREFERRED EMBODIMENTS

Figure 1:
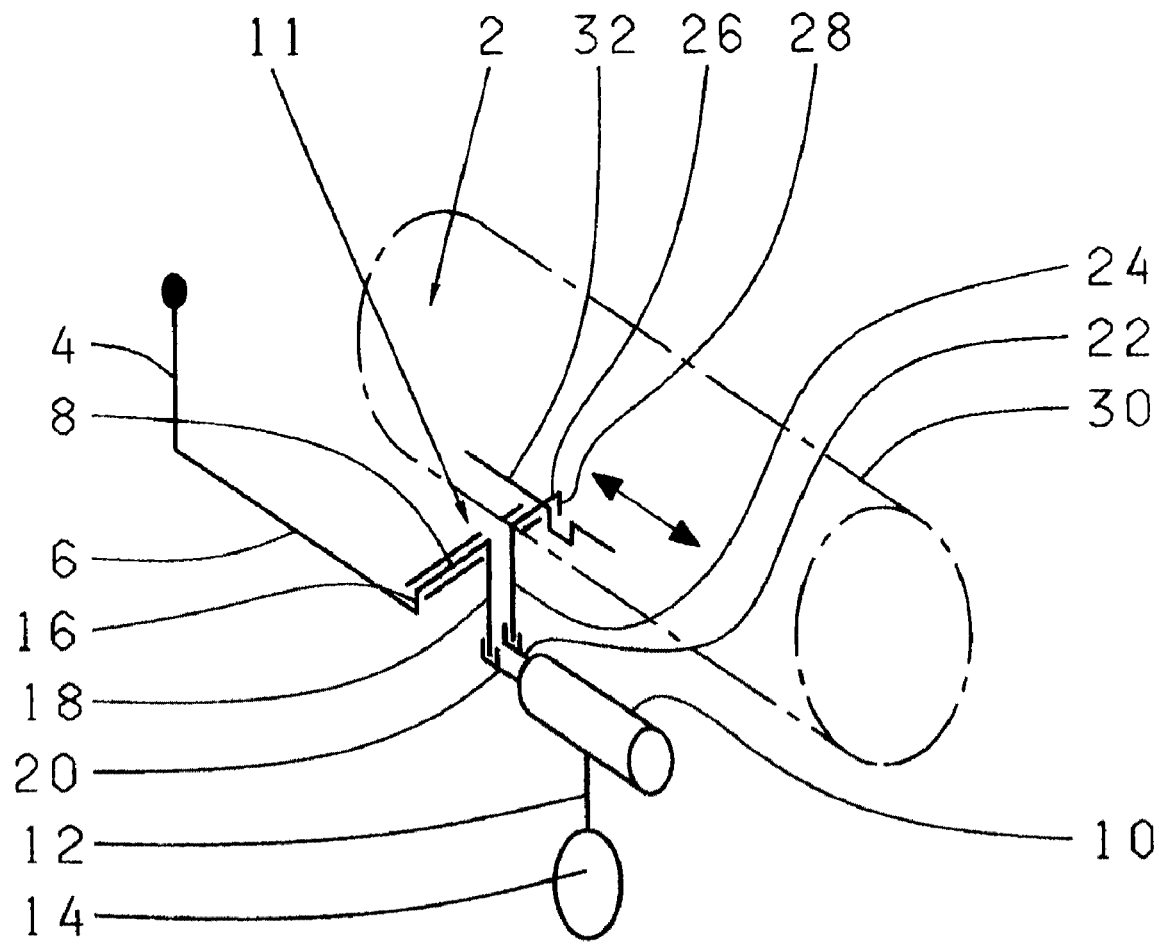
FIG. 1: Shift unit of the prior art

FIG. 1 is a diagrammatic representation of the shift unit 2 of a motor vehicle, according to the prior art. Starting from a shift lever 4, a shift rod 6 leads via a lever linkage 8 to a shift mechanism 11 with a pneumatic servo-assistance device 10. The pneumatic servo-assistance device 10 has a connection line 12 that leads to a reservoir container 14 from which the pneumatic servo-assistance device 10 is supplied with compressed air. The lever linkage 8 comprises a first lever 16 preferably articulated to the shift rod 6. The lever linkage 8 also comprises a second lever 18, which in turn engages a control rod 20 arranged in the pneumatic servo-assistance device 10. In addition, in the pneumatic servo-assistance device 10 is arranged a piston rod 22 in which a lever 24 engages, which is connected via a rotary shifting shaft 26 to a lever 28 in the vehicle's transmission 30. The lever 28 engages in a shift rail 32 by means of which, in a known manner, transmission ratios of the transmission can be engaged. Movement of the lever 24 is converted by the shifting shaft 26 into movement of the lever 28, so that the lever 28 can displace the shift rail 32 axially. During this axial movement the shift rail 32 preferably adopts three positions, namely two axial end positions, each corresponding to an engaged transmission ratio, and a central position between the end positions, which corresponds to a neutral setting of the transmission.

Figure 2:
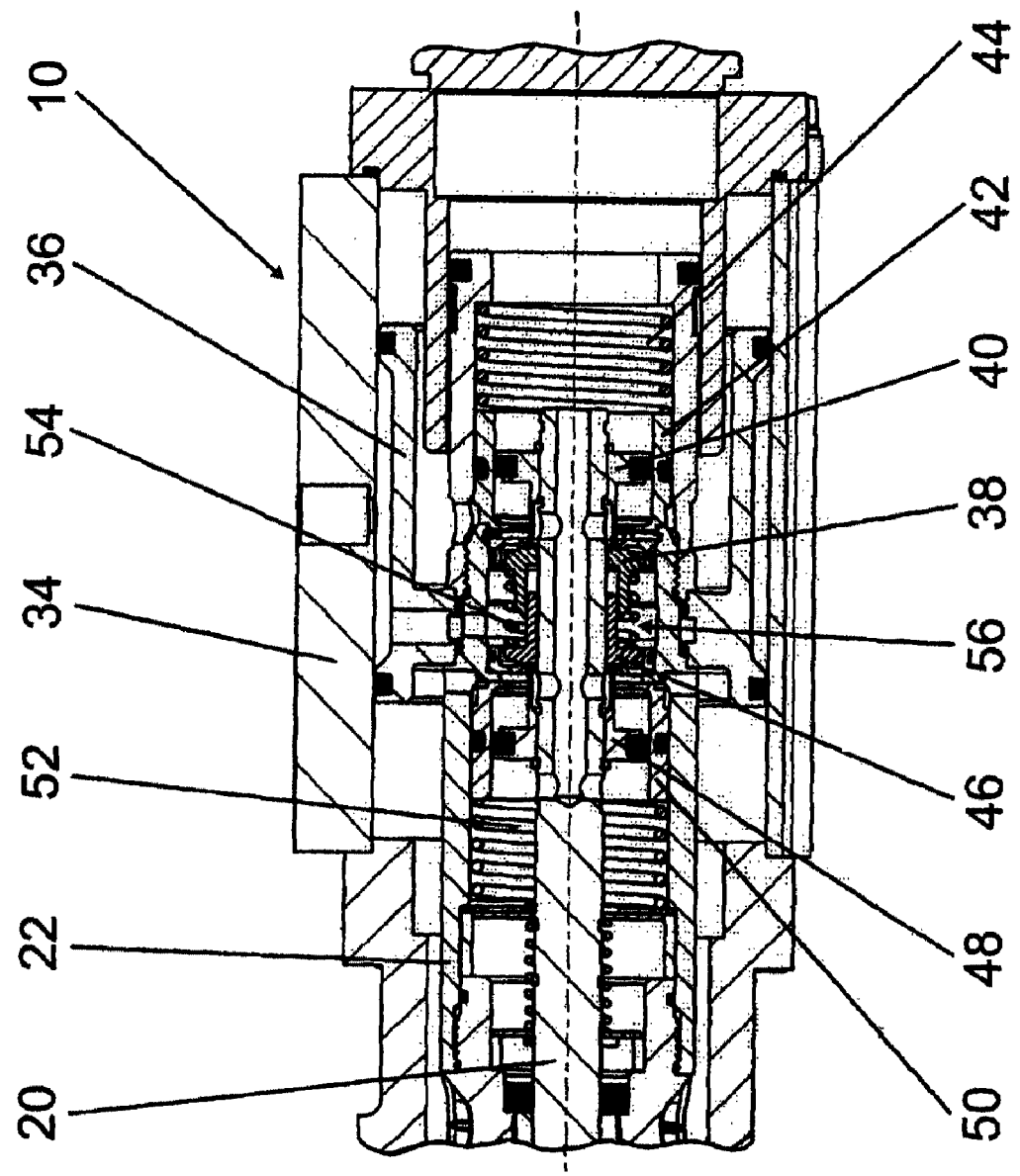
FIG. 2: Sectioned view of an embodiment of the servo-assistance device in a neutral position

FIG. 2 shows a sectioned view of the servo-assistance device 10 according to the invention, in a neutral position. The servo-assistance device 10 comprises a control rod 20 and a piston rod 22, as well as a cylinder 34 and a piston 36. The control rod 20 of the servo-assistance device 10 is arranged to move axially within the piston rod 22 and co-operates, via a gearshift linkage, with a shift lever (see FIG. 1). The piston 36 and the piston rod 22 are connected fixed to one another or made as one component. The piston rod 22 co-operates with means for shifting the gear-type variable-speed transmission (see FIG. 1). A valve 56 consists of valve pistons 40, 48 and valve slides 38, 46. The valve pistons 40, 48 are arranged fixed on the control rod 20, so that actuation of the control rod 20 actuates them too along their axes and also in the axial direction relative to the control rod 20. Between the valve pistons 40, 48 the valve slides 38, 46 are also arranged to move axially. The valve slides 38, 46 are held axially apart from one another by a spring element 54 and each rests against a valve seat of the piston rod 22. According to the invention the servo-assistance device 10 has trailing pistons 42, 50 and trailing piston springs 44, 52. The trailing pistons 42, 50 are for example made in the form of a hollow cylinder which, on the side opposite the trailing piston springs 44, 52, has an abutment formed in the direction toward the control rod 20. The abutment can for example be formed with the trailing pistons 42, 50 as one component. Likewise, it is conceivable for the abutment to consist, for example, of a securing ring. The trailing piston springs 44, 52 can for example be spiral springs or cup springs. In this case the trailing pistons 42, 50 are arranged so that they surround both the control rod 20 and the valve pistons 40, 48 and can move in the axial direction relative to the control rod 20. The trailing piston springs 44, 52 rest at one end against an abutment of the piston rod 22 and at the other end against the trailing pistons 42, 50. When the servo-assistance device 10 is not actuated, i.e. when the vehicle's transmission is in the neutral position, the valve slides 38, 46 rest against the valve seats of the piston rod and the trailing pistons 42, 50 are pressed by the trailing piston springs 44, 52 against corresponding abutments of the piston rod 22.

Figure 3:
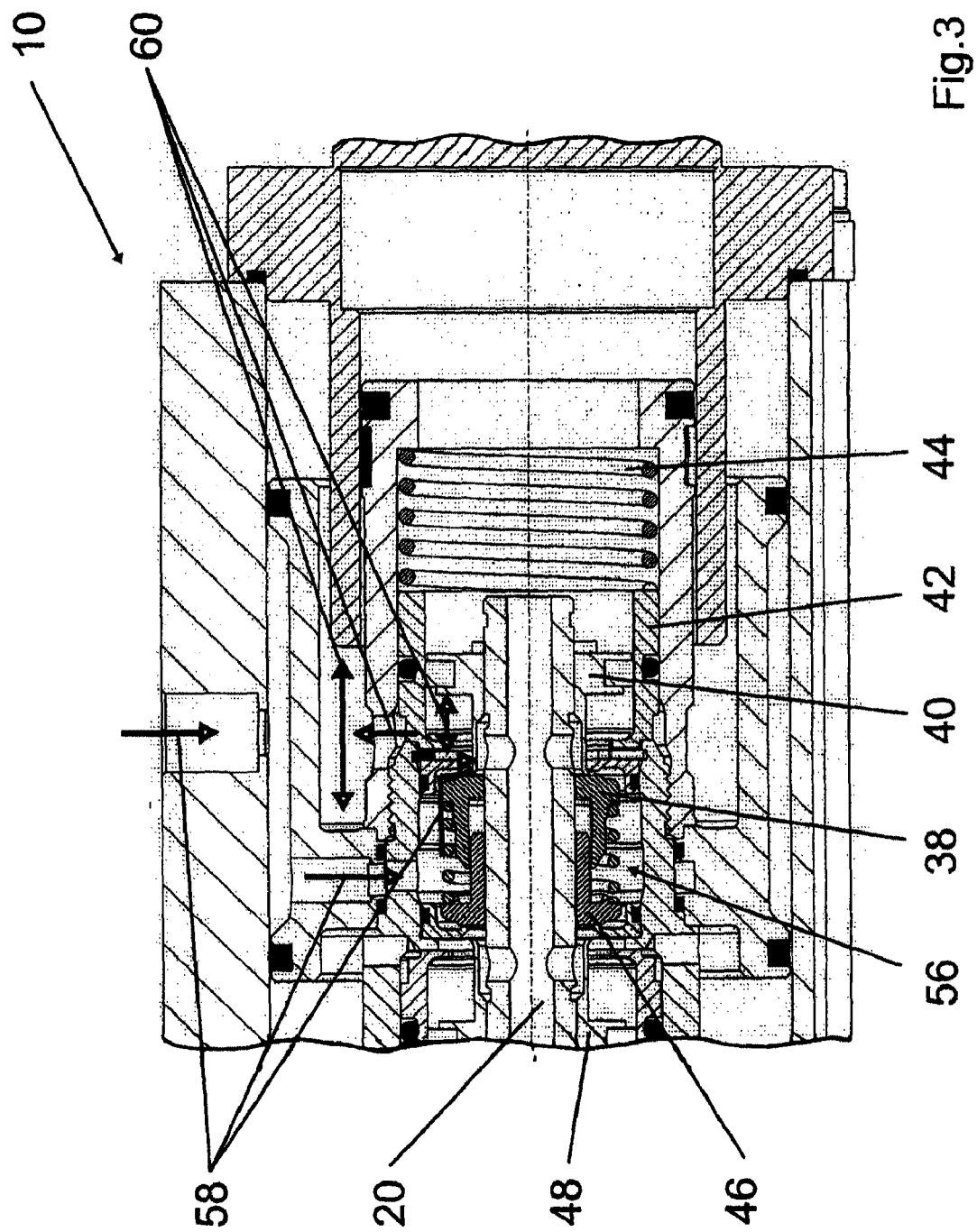
FIG. 3: Sectioned view of an embodiment of the servo-assistance device in a section of its characteristic curve with a steep gradient

FIG. 3 shows a sectioned view of the servo-assistance device 10 according to the invention for a regulation setting in the area of the steep characteristic curve. By virtue of a manual shifting force, the control rod 20 has been moved to the left in the plane of the drawing. Thus, the valve piston 40 fixed on the control rod 20 has also moved to the left. By means of the valve piston 40 the valve slide 38 is actuated, so that it moves clear of the valve seat of the piston rod 22 and opens the valve 56. By virtue of an existing reservoir pressure 58 the open valve 56 controls a servo-pressure 60 in accordance with the prevailing control rod force. The pressure force acting due to the controlled servo-pressure 60 upon the trailing piston 42 is smaller than the force produced by the trailing piston spring 44, so the trailing piston 42 still rests against the abutment of the piston rod 22 and the trailing piston spring 44 is not compressed. The manual shifting force or control rod force therefore only opposes the pressure force acting on the valve piston 40, and this corresponds to a regulation setting in the area of the steep characteristic curve.

The effect is analogous when the control rod 20 is actuated to the right in the plane of the drawing. In that case the valve slide 46 is actuated by the valve piston 48, whereby the valve slide 46 moves clear of the valve seat of the piston rod 22 and therefore opens the valve 56.

Figure 4:
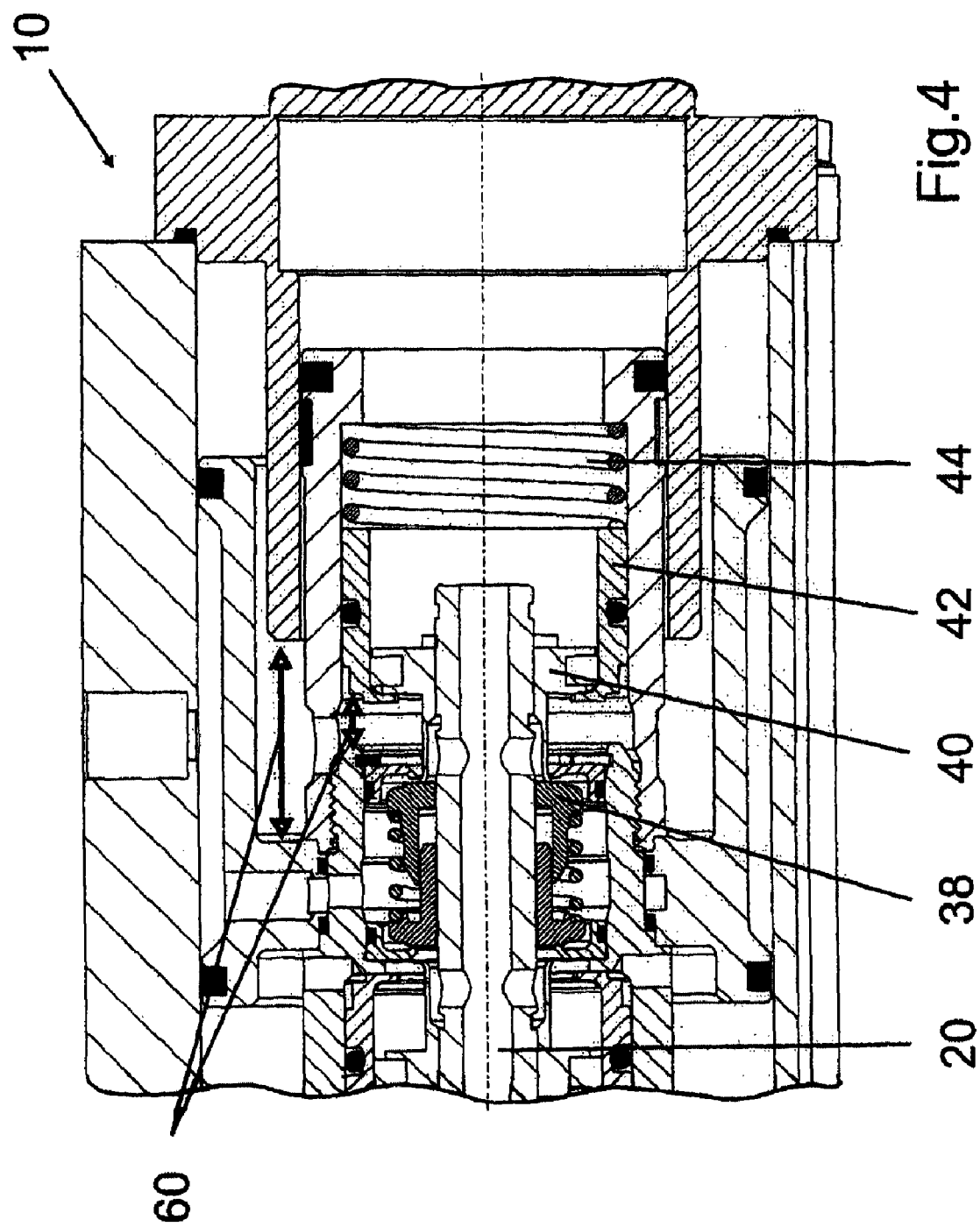
FIG. 4: Sectioned view of an embodiment of the servo-assistance device in a section of its characteristic curve with a shallower gradient

FIG. 4 shows a sectioned view of the servo-assistance device 10 according to the invention for a regulation setting in the area of the less steep characteristic curve. In contrast to FIG. 3, in this case the manual shifting force is larger so the control rod 20 of the servo-assistance device 10 is moved farther to the left. Thus, the valve slide 38 is also pushed by the valve piston 40 farther to the left, so that the valve 56 opens more. This produces a correspondingly higher servo-pressure 60. The controlled servo-pressure 60 is now large enough for the trailing piston spring 44 to be compressed by the trailing piston 42 so that the trailing piston 42 is pushed, against the force of the trailing piston spring 44, toward the valve piston 40. Thus, the manual shifting force or control rod force opposes both the pressure force acting directly on the valve piston 40 and the pressure force transmitted by the trailing piston 42 to the valve piston 40. This increases the pressure force acting in opposition to the manual shifting force or control rod force and the characteristic curve shows an inflection point. The regulation position corresponds to the range in which the characteristic curve is less steep. The positions of the control rod 20 and the valve piston 40, 48 fixed to the control rod 20 do not change, so the "bent" characteristic curve is produced in a path-independent manner.

In turn, the situation produced by actuating the control rod 20 to the right in the plane of the drawing is analogous.

Figure 5:
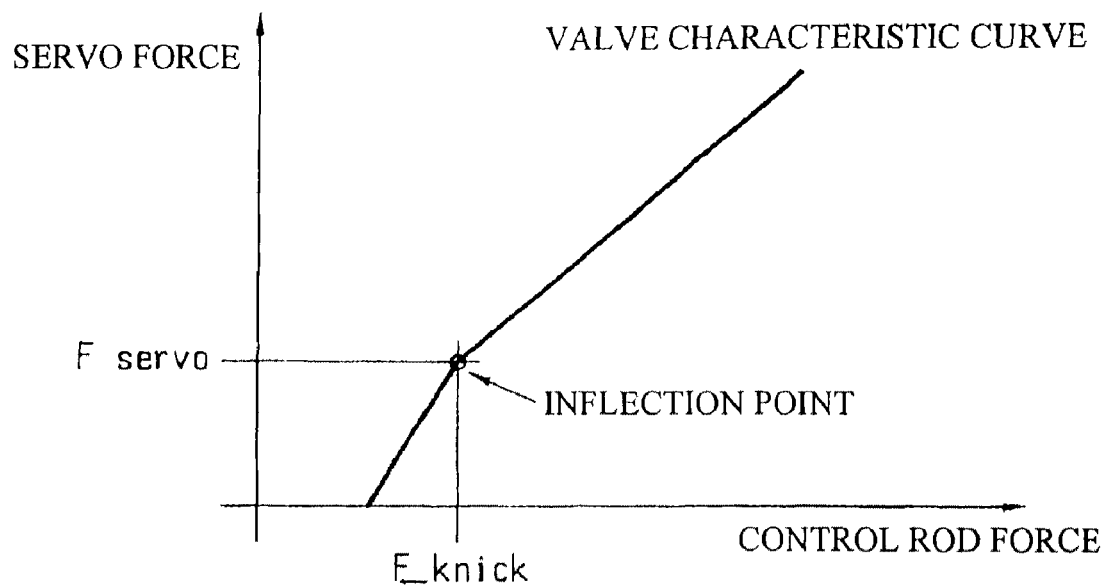
FIG. 5: A valve characteristic curve.

FIG. 5 shows the servo-force as a function of the control rod force. The valve characteristic curve produced by virtue of the servo-assistance device 10 according to the invention has an inflection point, beyond which the course of the characteristic is less steep so as to treat the components involved in a gearshift more gently.

If the control rod force is smaller than F_knick, then the controlled servo-pressure 60 is not large enough to move the trailing piston 42, 50 against the force of the trailing piston spring 44, 52. The controlled servo-pressure 60 only acts upon the valve piston 40, 48. Thus, the pressure force produced acts exclusively as a reaction force in opposition to the control rod force. This regulation position corresponds to the steep range of the characteristic curve.

If the manual shifting force is increased until the control rod force is larger than F_knick, then the trailing piston 42, 50 is pushed toward the valve piston 40, 48 against the force of the trailing piston spring 44, 52. Accordingly, to the pressure force of the valve piston 40, 48 previously acting as a reaction force upon the control rod 20, is added the pressure force acting from the trailing piston 42, 50 upon the valve piston 40, 48 (the pressure force exerted by the servo-pressure 60 on the trailing piston 42, 50, less the force of the trailing piston spring). Thus, the range in which the control rod force is larger than F_knick corresponds to the less steep section of the characteristic curve. The inflection point of the characteristic curve can be determined as a function of the design of the trailing piston spring 44, 52.

By virtue of the servo-assistance device 10 according to the invention a characteristic curve with a "bend" can be produced without changing the position of the control rod 20 and the valve piston 40, 48 connected fixed to the control rod 20. The control rod 20 undergoes only a minimal adjustment movement which is not perceptible by a vehicle driver with his hand on the shift lever.

At the beginning of a shift operation sufficient servo-assistance force is ensured, such that during a synchronous phase a servo-assistance force is produced which does not overload the components involved in the shift or synchronization operations.

INDEXES

2 Shifting unit
4 Shift lever
6 Shift rod
8 Lever linkage
10 Servo-assistance device
12 Connection line
14 Reservoir container
16 Lever
18 Lever
20 Control rod
22 Piston rod
24 Lever
26 Shifting shaft
28 Lever
30 Vehicle transmission
32 Shift rail
34 Cylinder
36 Piston
38 Valve slide
40 Valve piston
42 Trailing piston
44 Trailing piston spring
46 Valve slide
48 Valve piston
50 Trailing piston
52 Trailing piston spring
54 Spring element
56 Valve
58 Reservoir pressure
60 Controlled servo-pressure

The invention claimed is:

1. A servo-assistance device (10) for a shift mechanism of a motor vehicle transmission, with which a characteristic curve is produced which, as a function of either a manual shifting force or a shift phase, comprises ranges of different gradients or proportionality to the manual shifting force, the servo-assistance device (10) comprising an element (20) upon which the manual shifting force to be assisted acts,
wherein the servo-assistance device (10) comprises a valve (56) with valve pistons (40, 48), and
means (42, 44, 50, 52) upon which a servo-pressure (60) acts such that the servo-pressure (60) acts upon one of the valve pistons (40, 48) to produce a first range of the characteristic curve and, beyond a specifiable servo-pressure (60), the means (42, 44, 50, 52) co-operates with the valve pistons (40, 48) such that a second range of the characteristic curve is produced, whose gradient is smaller than a gradient of the first range of the characteristic, in such manner that the element (20) maintains its current position.

2. The servo-assistance device (10) according to claim 1, wherein the element (20) is a control rod of the servo-assistance device (10).

3. The servo-assistance device (10) according to claim 1, wherein the servo-assistance device (10) comprises a piston rod (22) which co-operates with a means for shifting a gear-type variable-speed transmission.

4. The servo-assistance device (10) according to claim 2, wherein the valve (56) comprises the valve pistons (40, 48) and valve slides (38, 46), and the valve pistons (40, 48) are fixed to the control rod (20).

5. The servo-assistance device (10) according to claim 1, wherein the means (42, 44, 50, 52) comprise a trailing piston (42, 50) that co-operates with the valve (56) and a trailing piston spring (44, 52).

6. The servo-assistance device (10) according to claim 3, wherein two trailing pistons (42, 50) are arranged inside the piston rod (22), surround a control rod (20) and the valve pistons (40, 48) and contact against an abutment of the piston rod (22).

7. The servo-assistance device (10) according to claim 5, wherein the trailing piston spring (44, 52) abuts against an abutment of the piston rod, on one side, (22) and abuts the trailing piston (42, 50), on an opposite side.

8. The servo-assistance device (10) according to claim 5, wherein the trailing piston (42, 50) is a hollow cylinder and, on a side opposite the trailing piston spring (44, 52), has an abutment facing the control rod (20).

9. The servo-assistance device (10) according to claim 5, wherein the trailing piston spring (44, 52) is one of a spiral spring and a cup spring.

10. The servo-assistance device (10) according to claim 5, wherein an inflection point of the characteristic curve is determined as a function of the trailing piston spring (44, 52).

11. A method of producing a characteristic curve of a servo-assistance device (10) for a shift mechanism of a motor vehicle transmission, such that the characteristic curve has ranges with either different gradients or proportions to a manual shifting force as a function of either the manual shifting force or a shift phase, and the servo-assistance device (10) comprises an element (20) acted upon by the manual shifting force to be assisted, wherein a valve (56) with valve pistons (40, 48) and means (42, 44, 50, 52) are provided in the servo-assistance device (10), upon which a servo-pressure (69) acts, such that a first range of the characteristic curve is produced when a servo-pressure (60) acts on one of the valve pistons (40, 48) and, beyond a specifiable servo-pressure (60), the means (42, 44, 50, 52) are actuated and co-operate with the valve pistons (40, 48) such that a second range of the characteristic curve is produced, and has a gradient smaller than a gradient of the first range of the characteristic curve.

12. The method according to claim 11, further comprising the steps of employing as the means (42, 44, 50, 52), trailing pistons (42, 50) and trailing piston springs (44, 52) which co-operate with a piston rod (22), which co-operates with means for shifting a gear-type variable-speed transmission, and with a valve (56), which comprises the valve pistons (40, 48) fixed to the element (20), being a control rod of the servo-assistance device (10), and valve slides (38, 46).

13. The method according to claim 12, further comprising the step of biasing the trailing pistons (42, 50), when not actuated, with the trailing piston springs (44, 52) against abutments of the piston rod (22).

14. The method according to claim 12, further comprising the step of biasing the trailing pistons (42, 50), when actuated, toward the valve pistons (40, 48) against an action of the trailing piston springs (44, 52).

15. The method according to claim 12, further comprising the steps of determining an inflection point in the characteristic curve as a function of a design of the trailing piston springs (44, 52).

* * * * *